US012283260B2

(12) United States Patent
Jin et al.

(10) Patent No.: US 12,283,260 B2
(45) Date of Patent: Apr. 22, 2025

(54) GRAND PIANO SOUNDBOARD WITH A BAR AND SOUND TUNNELS

(71) Applicant: SUZHOU LI YUE MUSICAL INSTRUMENTS CO., LTD., Jiangsu (CN)

(72) Inventors: Haiou Jin, Suzhou (CN); Nianbo Wu, Suzhou (CN); Xinxi He, Suzhou (CN); Xinzhi Zhu, Suzhou (CN); Biying Li, Suzhou (CN); Ping Yang, Suzhou (CN)

(73) Assignee: SUZHOU LI YUE MUSICAL INSTRUMENTS CO., LTD., Suzhou (CN)

( * ) Notice: Subject to any disclaimer, the term of this patent is extended or adjusted under 35 U.S.C. 154(b) by 313 days.

(21) Appl. No.: 18/026,237

(22) PCT Filed: Dec. 16, 2020

(86) PCT No.: PCT/CN2020/136859
§ 371 (c)(1),
(2) Date: Apr. 3, 2023

(87) PCT Pub. No.: WO2022/036964
PCT Pub. Date: Feb. 24, 2022

(65) Prior Publication Data

US 2023/0368751 A1 Nov. 16, 2023

(30) Foreign Application Priority Data

Aug. 19, 2020 (CN) ........................ 202010838859.5

(51) Int. Cl.
*G10C 1/04* (2006.01)
*G10C 3/06* (2006.01)

(52) U.S. Cl.
CPC *G10C 1/04* (2013.01); *G10C 3/06* (2013.01)

(58) Field of Classification Search
CPC .................................... G10C 1/04; G10C 3/06
See application file for complete search history.

(56) References Cited

U.S. PATENT DOCUMENTS 3,688,011 A * 8/1972 Yamamoto ........... H04R 1/2811 84/195
8,450,587 B2 * 5/2013 McPherson .............. G10D 3/02 84/267

(Continued)

FOREIGN PATENT DOCUMENTS

CN 102422345 A 4/2012
CN 204390697 U 6/2015

(Continued)

OTHER PUBLICATIONS

May 19, 2021 International Search Report issued in International Patent Application No. PCT/CN2020/136859.

(Continued)

*Primary Examiner* — Robert W Horn
(74) *Attorney, Agent, or Firm* — Oliff PLC

(57) ABSTRACT

A grand piano soundboard with a bar and sound tunnels has an outer wall with first and second grooves. The first groove is arranged diagonally in the width direction. The second groove is arranged diagonally in the length direction. The grooves cross and connect on the outer wall of the soundboard. The outer wall is divided into four resonance regions, and its center has a bar assembly having strip-shaped bar members arranged on both sides of the grooves in pairs; The grooves form a sound tunnel on the outer wall. The soundboard is changed from the previous free vibration mode to the current standard vibration mode. The treble of the grand piano is bright and the bass was sonorous and mellow from the perspectives of vibration, resonance and phonation. The design scheme has outstanding substantive characteristics (Continued)

and remarkable technical progress, and has obtained technical results.

11 Claims, 7 Drawing Sheets

(56) References Cited

U.S. PATENT DOCUMENTS

| | | | | |
|---|---|---|---|---|
| 2013/0042739 | A1 | 2/2013 | McPherson | |
| 2023/0368751 | A1* | 11/2023 | Jin | G10C 1/04 |

FOREIGN PATENT DOCUMENTS

| | | | | | |
|---|---|---|---|---|---|
| CN | 206097877 | U | | 4/2017 | |
| CN | 111951748 | A | | 11/2020 | |
| CN | 212434227 | U | * | 1/2021 | G10D 1/14 |
| CN | 212541873 | U | | 2/2021 | |
| CN | 218602075 | U | * | 3/2023 | |
| CN | 218631344 | U | * | 3/2023 | |
| GB | 268041 | A | | 3/1927 | |

OTHER PUBLICATIONS

Feb. 16, 2023 International Preliminary Report on Patentability issued in International Patent Application No. PCT/CN2020/136859.

* cited by examiner

GRAND PIANO SOUNDBOARD WITH A BAR AND SOUND TUNNELS

TECHNICAL FIELD

The invention relates to a grand piano, in particular to a grand piano soundboard with a bar and sound tunnels.

BACKGROUND TECHNOLOGY

Piano is a kind of keyboard instrument in western classical music, with the reputation of "king of musical instruments". It is composed of 88 piano keys (52 white keys, 36 black keys) and metal stringed soundboard.

The piano has six main structures, including the strings, the iron frame, the soundboard, the action system, the wooden case, and the pedal. The soundboard (see FIG. 1) is composed of resonance board, ribs, soundboard frame and bridge. The resonance board is like a thin plate, with the ribs arranged at a certain distance attached to the bottom, the soundboard frame attached to the periphery, and the alto-treble bridge and bass bridge fixed on the top. When the strings vibrate, the soundboard is vibrated and the soundboard starts to work through the transmission of the bridge attached to the soundboard. The soundboard is one of the components that play an important role in the sound quality of the piano. After the strings are struck by the hammer, it vibrates and sounds. Through the transmission of the bridge, the sound plate bears the vibration from the strings and enhances the sound radiation, strengthens its original sound, and broadcasts the energy it obtains from the vibrating strings into the air as much as possible.

The piano usually has a range of seven octaves, of which the treble register takes up about half an octave, the alto register about four octaves, and the bass register about two and a half octaves.

The common problem with the traditional grand piano is:

When the grand piano is pronounced, its soundboard has an inherent resonance frequency, beyond a certain range of resonance frequency, the treble is not bright and the bass is not sonorous and mellow enough. In particular, the quality of the bass register has always been the weakness of the piano, even limiting the width of the composer's creation. The main reason is that the soundboard of the current grand piano cannot meet the good wide frequency vibration from the treble to the bass register, that is, it cannot adapt to the wide frequency variation resonance and vibration of the treble register, alto register and bass register at the same time. In conclusion, the structure design of the soundboard of the traditional grand piano is unreasonable, which is not conducive to the soundboard to play a good acoustic vibration from the treble to the bass register.

Therefore, how to solve the shortcomings of the above existing technologies has become the subject to be studied and solved by the invention.

SUMMARY OF THE INVENTION

The purpose of the invention is to provide a grand piano soundboard with a bar and sound tunnels.

To achieve the above purpose, the technical scheme adopted by the invention is: A grand piano soundboard with a bar and sound tunnels:

The inner wall of the soundboard is arranged toward the strings of the piano; The outer wall of the soundboard is provided with a first groove and a second groove, wherein the first groove is arranged diagonally in the width direction of the soundboard, the second groove is arranged diagonally in the length direction of the soundboard; The first groove and the second groove cross and connect with each other on the outer wall of the soundboard, the intersection point is located in the center of the soundboard, and then the outer wall of the soundboard is divided into four resonance regions; The center of the outer wall of the soundboard is also provided with a bar assembly, which comprises a plurality of strip-shaped bar members, which are arranged on both sides of the first groove and the second groove in pairs; The first groove and the second groove respectively form a sound tunnel on the outer wall of the soundboard.

Relevant contents of the above technical scheme are explained as follows:

1. In the above scheme, the first groove and the second groove cross and connect with each other on the outer wall of the soundboard, which is helpful to rapidly transmit the vibration of the strings to the surrounding of the soundboard through the cross-shaped sound tunnel formed by the grooves.
2. In the above scheme, the intersection of the first groove and the second groove is located in the center of the soundboard to improve the sound quality and timbre of the soundboard.
3. In the above scheme, a connecting bar is set between the two adjacent strip-shaped bar members, and the connecting bar spans above the first groove and the second groove, forming the bar assembly in a well shape; The connecting bars are all located in the central area of the soundboard surface. With this design, the central area of the soundboard can be strengthened.
4. In the above scheme, Each resonance region of the soundboard is respectively provided with a plurality of radial bars; each radial bar in the same resonance region is arranged in parallel; there is at least one radial bar, one end of which is oriented towards the geometric center of the soundboard in the horizontal direction, thereby enhancing the strength of the soundboard.
5. In the above scheme, the soundboard is also provided with a plurality of radial bars, which are located in the resonance regions and radially arranged with the center of the soundboard in the horizontal direction as the reference.
6. In the above scheme, the soundboard is divided into a treble register in the periphery, an alto register in the middle and a bass register in the center from the sound frequency band; The wall thickness of the soundboard gradually increases from the periphery to the center, and the wall thickness of the bass region is greater than the wall thickness of the alto area, and the wall thickness of the alto region is greater than the wall thickness of the treble region; The bar assembly is located in the bass region.

In this design, by setting the thicker bass region close to the center, the low-frequency vibration with lower frequency and larger amplitude can produce a sonorous and mellow bass in the bass region of the soundboard; By setting the thinner treble region away from the center, the high-frequency vibration with higher frequency and smaller amplitude can produce a more transparent and bright treble in the treble region of the soundboard, thus effectively improving the timbre and sound quality of the grand piano in the full frequency band.

7. In the above scheme, the strip-shaped bar member is composed of a wooden base and a weight increasing block connected to the wooden base. This design can strengthen the central area of the soundboard and play a positive role in improving the timbre and quality of the bass.
8. In the above scheme, the thickness of the inner end of the strip-shaped bar member is greater than the thickness of its outer end. The thickness of the inner end of the radial bar is greater than the thickness of its outer end. With this design, the central area of the soundboard can be strengthened.
9. In the above scheme, the first groove and the second groove are arc grooves, which can minimize the sudden change in thickness of the soundboard and avoid affecting the resonance and vibration of the soundboard.
10. In the above scheme, the length of the first groove and the second groove are less than the horizontal width of the soundboard, and a smooth transition surface is arranged between the outer end of the first groove and the second groove and the outer wall of the soundboard.

The working principle and advantages of the invention are as follows:

The invention discloses a grand piano soundboard with a bar and sound tunnels. The outer wall of the soundboard is provided with a first groove and a second groove. The first groove is arranged diagonally in the width direction of the soundboard, and the second groove is arranged diagonally in the length direction of the soundboard; The two grooves cross and connect each other, dividing the outer wall of the soundboard into four resonance regions; A bar assembly is also arranged in the center of the outer wall of the soundboard, including a plurality of strip-shaped bar members; the strip-shaped bar members are arranged in pairs on both sides of the first groove and on both sides of the second groove; The two grooves respectively form a sound tunnel on the outer wall of the soundboard.

Compared with the prior art, in order to solve the problem that the existing grand piano cannot give consideration to the treble, alto and bass registers and have good resonance timbre at the same time, the invention improves the existing grand piano, especially the design of the soundboard inside the grand piano. It is embodied in the following aspects: first, the bar assembly is set up on the outer wall of the soundboard; Second, a cross groove is set up on the outer wall of the soundboard, so as to form a cross sound tunnel on the outer wall of the soundboard.

Aiming at the problems that the treble of the existing grand piano is not bright, and the bass is not sonorous and mellow enough, the design and sound generating mechanism of the grand piano are deeply discussed and studied, and the main reason for the poor timbre of the treble and the bass of the existing grand piano is found out that the soundboard design is not reasonable. Therefore, the inventor broke the shackles of the previous grand piano structure design and boldly proposed an improved design scheme of the invention. This improved design scheme changed the soundboard from the previous free vibration mode to the current standard vibration mode, and solved the problem that the treble of the grand piano is not bright enough and the bass was not sonorous and mellows enough from the perspectives of vibration, resonance and phonation. The practice proves that the improved design scheme has outstanding substantive characteristics and remarkable technical progress, and has obtained obvious technical results.

In particular, the invention improves the soundboard in response to the prominent sound quality problem in the bass region of the existing grand piano, making up for the short range of the piano and broadening the creative width of the composer.

Due to the application of the above technical scheme, the present invention has the following advantages and effects compared to the existing grand piano soundboard:

1. The present invention provides a bar assembly on the outer wall of the soundboard. Due to the large amplitude and low frequency of bass relative to treble, bass resonance is concentrated in the central area of the soundboard near the sound coil, and treble resonance is concentrated in the peripheral edge area of the soundboard, enhancing the strength of the central area of the soundboard, which plays an important role in improving the timbre and sound quality in the bass. Due to the thickness gradient structure of the soundboard, which is thick in the central area and thin around, the strength of the central area of the soundboard is enhanced, and the thickness difference between the central area and the surrounding edge area of the soundboard is relatively changed, which also plays a beneficial role in improving the timbre and sound quality of the treble register.
2. The invention provides a cross shaped groove on the outer wall of the soundboard, which actually forms a cross shaped sound tunnel on the outer wall of the soundboard. The vibration is collected from the center of the soundboard and quickly transmitted to the surrounding edges of the soundboard through the cross shaped sound tunnel (i.e., the tunnel of sound), which plays a key role in improving the timbre and sound quality of the treble register.
3. The present invention divides four resonance regions on the soundboard through the design of a bar assembly and a cross shaped groove. When playing a piano, the string vibration is first transmitted to the central region where the sound tunnels intersect, and then transmitted through the sound tunnels to these four resonance regions, generating resonance and vibration, thereby amplifying the string sound into the resonance sound of the soundboard. Before the improvement, when playing the piano, only three sound waves can be generated, that is, in the resonance cavity, the corresponding area of the soundboard is a resonance area, and the resonance region generates one sound wave amount, plus one string wave amount, plus one excitation wave amount, a total of three sound waves. The improved piano performance of the present invention can generate six sound waves, of which four resonance regions generate four sound waves, plus one string wave amount, plus one excitation wave amount, resulting in a total of six sound waves. The amount of sound waves is the number of sound waves. For a specific hammered string instrument, in addition to the amount of one string wave and one excitation wave, it mainly depends on the number of resonance regions of the soundboard. Generally, when an instrument is playing, each resonance region produces a sound wave amount, and how many resonance regions there are will produce how many sound waves. In addition, the amount of sound waves directly affects the timbre, penetration, and volume of an instrument. Therefore, the design of the present invention can significantly improve the timbre of the treble and bass registers, and increase the penetration of treble and bass registers.

4. Each groove of the present invention adopts arc-shaped grooves, which can minimize abrupt changes in thickness of the soundboard and avoid affecting the resonance and vibration of the soundboard.

Figure 1:
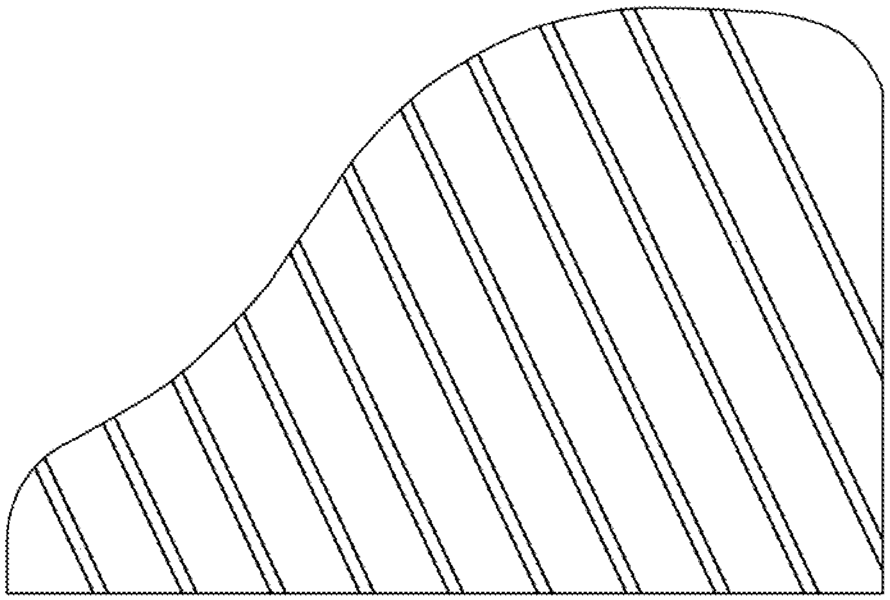
FIG. 1 is a structural schematic diagram of a traditional grand piano soundboard.
Figure 2:
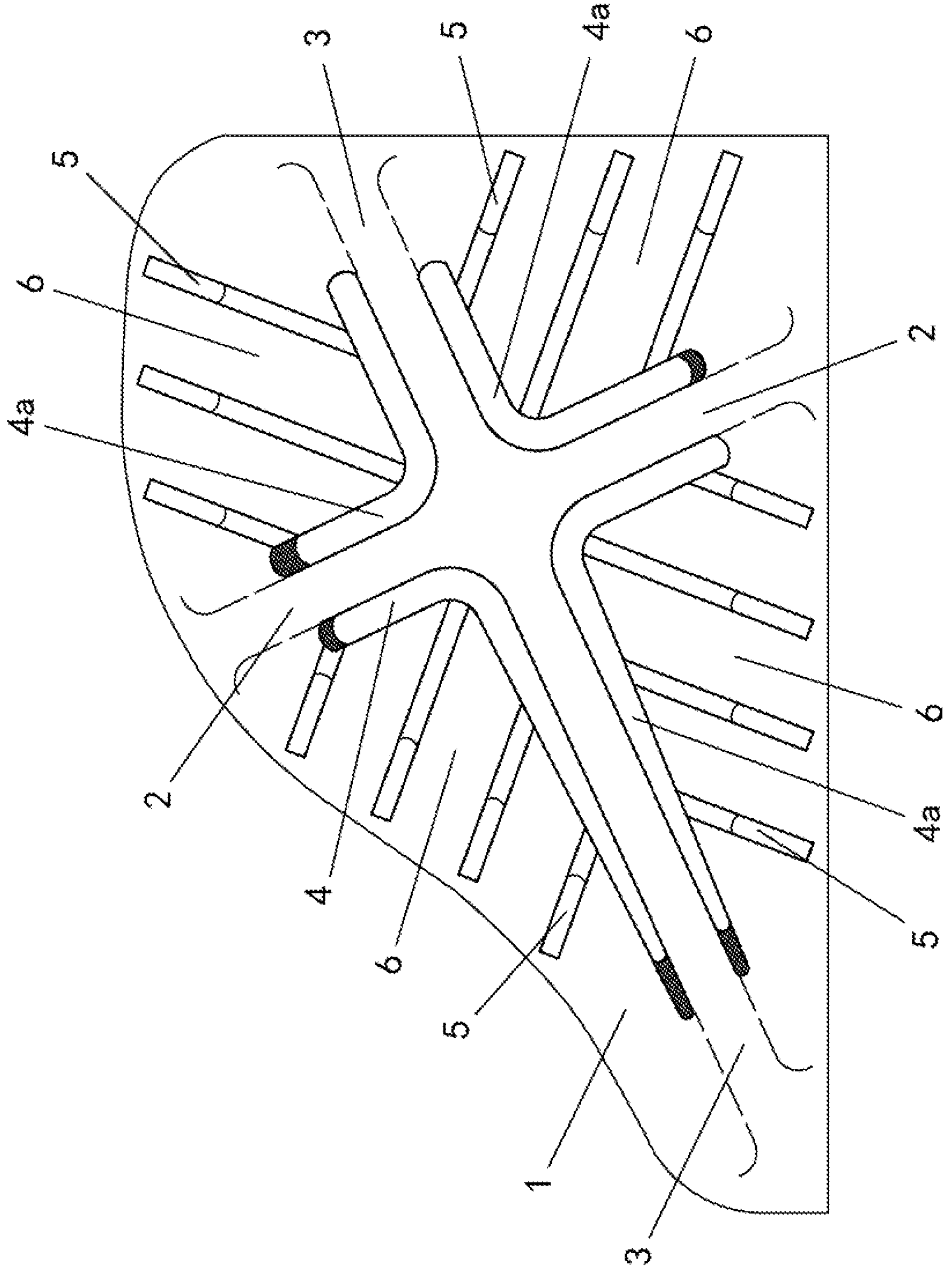
FIG. 2 is a structural schematic diagram of a soundboard (without a connecting bar) in the embodiment of the present invention.

In the above figures: 1. soundboard; 2. first groove; 3. second groove; 4. bar assembly; **4*a*. strip-shaped bar member; 4*b*. connecting bar; 5. radial bar; 6. resonance region; 7. wooden base; 8**. weight increasing block.

SPECIFIC IMPLEMENTATION

The invention is further described in combination with the attached figures and embodiments below:

Embodiment: The present invention will be clearly explained by the following schematics and detailed descriptions. Any person skilled in the field, after learning the embodiments of the present invention, may change and modify them by the techniques taught by the present invention, which is not out of the spirit and scope of the present invention.

As used herein, "connection" or "setting" can refer to two or more components or devices making physical contact with each other directly or indirectly, and can also refer to two or more components or devices operating or acting with each other.

The terms "comprise", "including", "provided", and etc. used in this article are all open terms, which means including but not limited to.

The terms used in this article, unless otherwise specified, usually have the common meaning of each word used in this field, in the content of this case and in the special content. Some words used to describe the invention will be discussed below or elsewhere in this specification to provide additional guidance for those skilled in the art on the description of the case.

As shown in FIGS. 2-10, a grand piano soundboard with a bar and sound tunnels: The inner wall of the soundboard 1 is arranged toward the strings of the piano.

The outer wall of the soundboard 1 is provided with a first groove 2 and a second groove 3; the first groove 2 is arranged diagonally in the width direction of the soundboard 1, the second groove 3 is arranged diagonally in the length direction of the soundboard 1; The first groove 2 and the second groove 3 cross and connect with each other on the outer wall of the soundboard 1, the intersection point is located in the center of the soundboard 1, and then the outer wall of the soundboard 1 is divided into four resonance regions 6.

The first groove 2 and the second groove 3 respectively form a sound tunnel on the outer wall of the soundboard 1.

By setting a cross shaped groove on the outer wall of the soundboard 1, the cross shaped groove actually forms a cross shaped sound tunnel on the outer wall of the soundboard 1, and the area close to the center collects the vibration of the strings. Then, the cross shaped sound tunnel quickly transmits to the surrounding edges of the soundboard 1, which plays a key role in improving the timbre and sound quality of the treble register. At the same time, by dividing four resonance regions 6 on the soundboard 1, vibrations can be transmitted through sound tunnels to these four resonance regions 6 and generate resonance, which can significantly improve the timbre of the treble and bass registers.

The center of the outer wall of the soundboard 1 is also provided with a bar assembly 4, which comprises a plurality of strip-shaped bar members **4*a*, which are arranged on both sides of the first groove 2 and the second groove 3** in pairs;

By setting a bar assembly 4 on the outer wall of the soundboard 1, due to the large amplitude and low frequency of the bass relative to the treble, the bass resonance is concentrated in the central area of the soundboard 1, and the treble resonance is concentrated in the peripheral edge area of the soundboard 1, strengthening the strength of the central area of the soundboard 1 and playing an important role in improving the timbre and sound quality in the bass register. Due to the thickness gradient structure (i.e., the design of thin periphery and thick center) of the central area of the soundboard 1, the strength of the central area of the soundboard 1 is enhanced, and the thickness difference between the central area and the surrounding edge area of the soundboard 1 is relatively changed, which can also play a beneficial role in improving the timbre and sound quality of the treble register.

Figure 3:
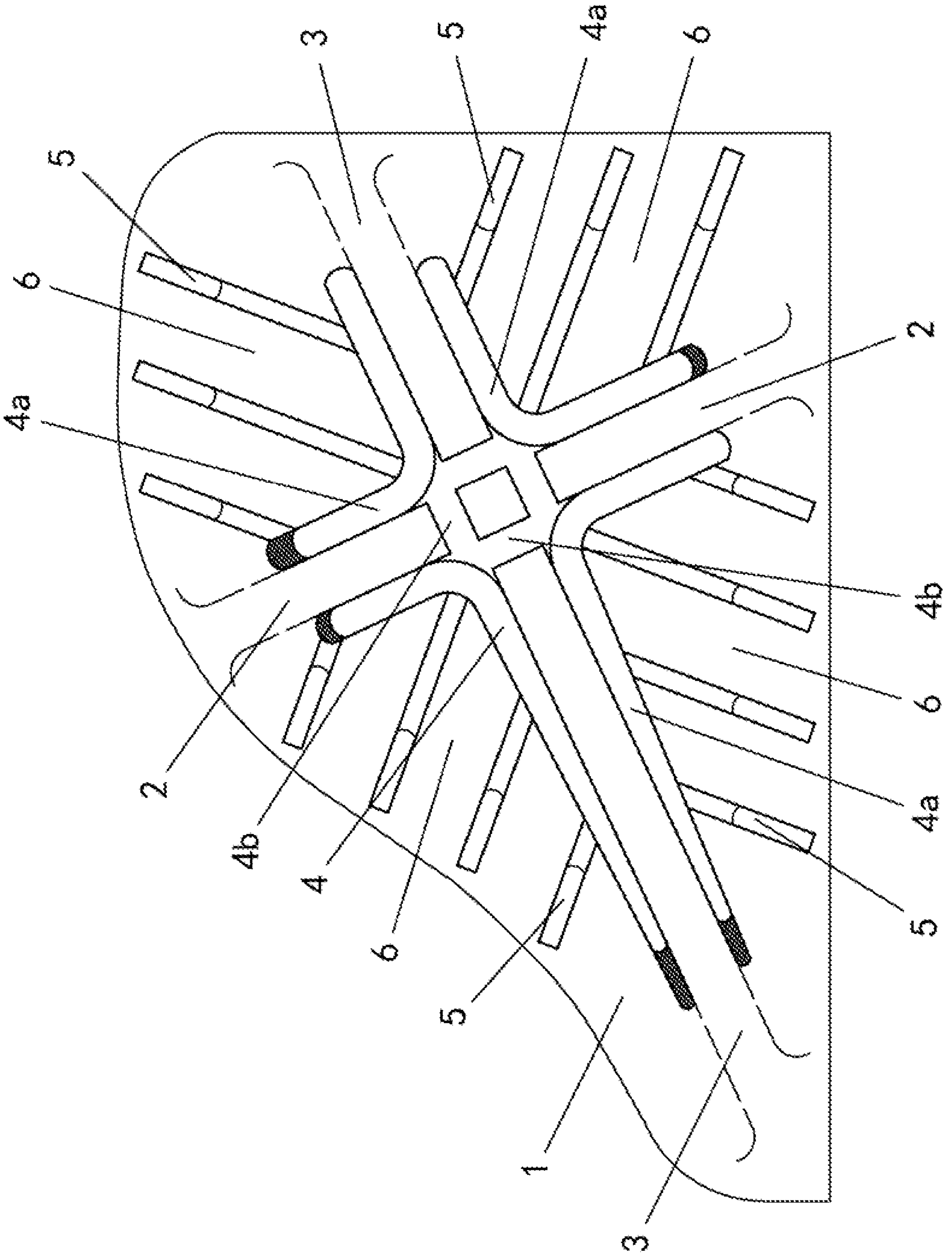
FIG. 3 is a structural schematic diagram of a soundboard (with connecting bars) in the embodiment of the present invention.
Figure 4:
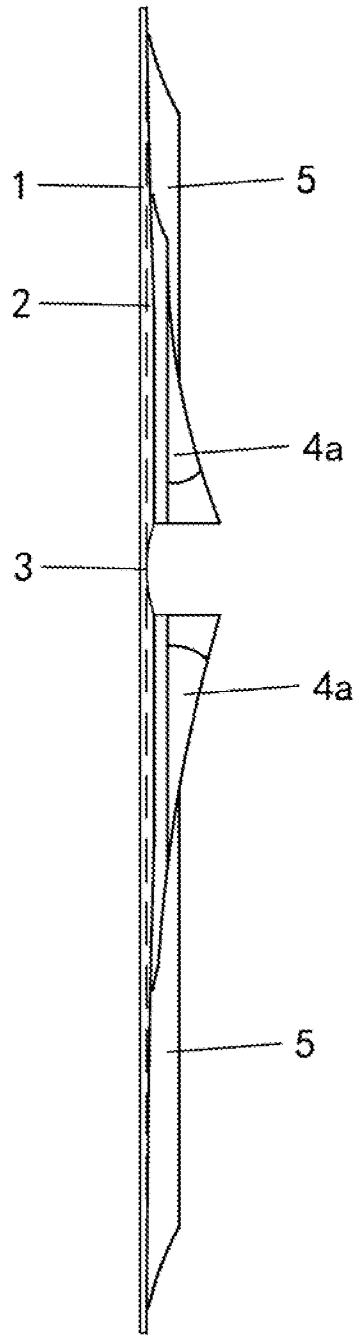
FIG. 4 is a side view diagram of a soundboard (without a connecting bar) in the embodiment of the present invention.
Figure 5:
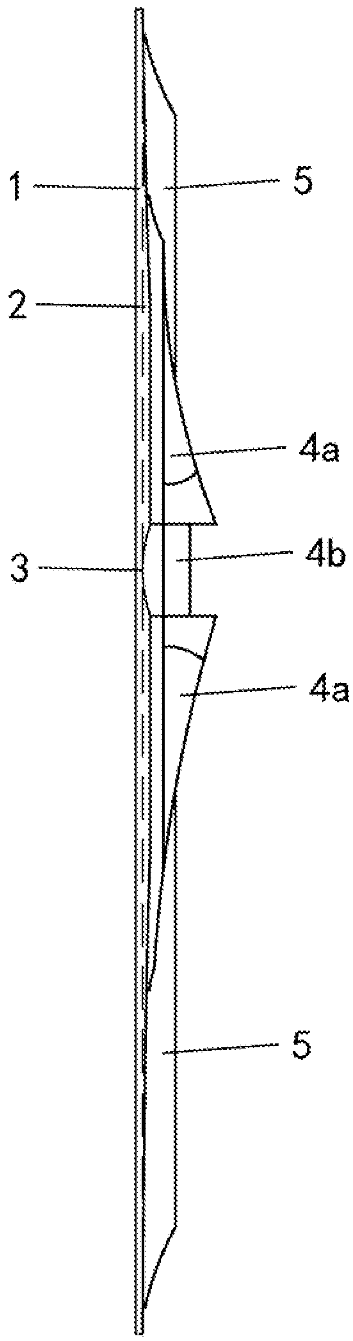
FIG. 5 is a side view diagram of a soundboard (with connecting bars) in the embodiment of the present invention.
Figure 6:
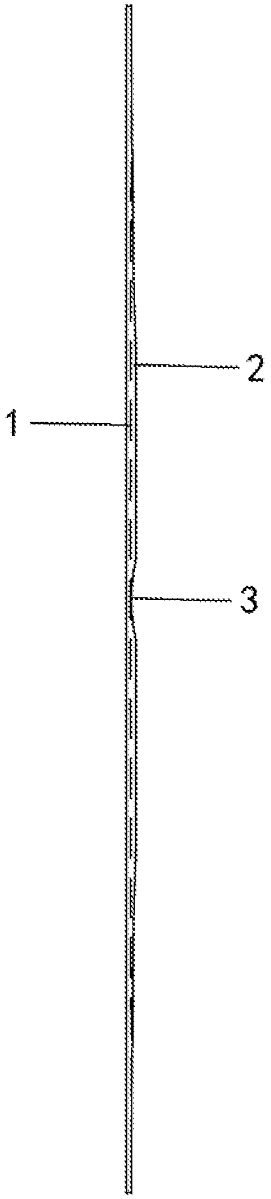
FIG. 6 is a sectional schematic diagram of the soundboard body of the embodiment of the present invention.

Preferred, as shown in FIGS. 3 and 5, a connecting bar **4*b* is arranged between the adjacent two strip-shaped bar members 4*a*, and the connecting bar 4*b* spans above the first groove 2 and the second groove 3; the bar assembly 4 is well shaped; The connecting bars 4*b* are located in the central area of the surface of the soundboard 1. A "square" shaped reinforcement structure is formed by four connecting bars 4*b* to further strengthen the bass region in the center of the soundboard 1**, in order to further improve the sound quality of the piano bass region.

Preferred, The soundboard 1 is divided into a treble register in the periphery, an alto register in the middle and a bass register in the center from the sound frequency band; The wall thickness of the soundboard 1 gradually increases from the periphery to the center, and the wall thickness of the bass region is greater than the wall thickness of the alto area, and the wall thickness of the alto region is greater than the wall thickness of the treble region. With this design, by setting a thicker bass region close to the center, low-frequency vibrations with lower frequencies and larger amplitudes can emit a sonorous and mellow bass in the bass region of soundboard 1; By setting a thinner treble region away from the center, high-frequency vibrations with higher frequencies and smaller amplitudes can emit a more transparent and bright treble in the treble region of soundboard 1.

The bar assembly 4 is located in the bass region and can further enhance the load in the middle region of the soundboard 1.

Figure 8:
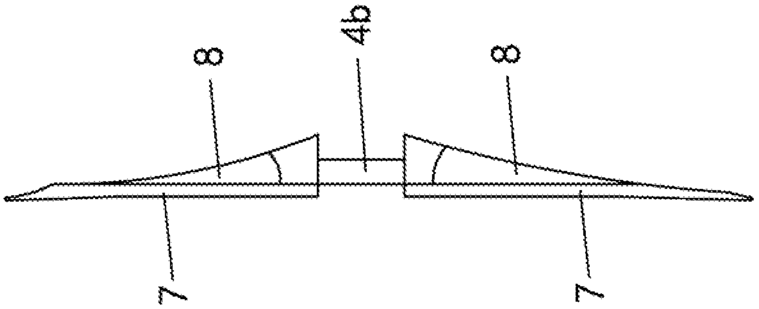
FIG. 8 is a side view diagram of a bar assembly (with connecting bars) in the embodiment of the present invention.
Figure 7:
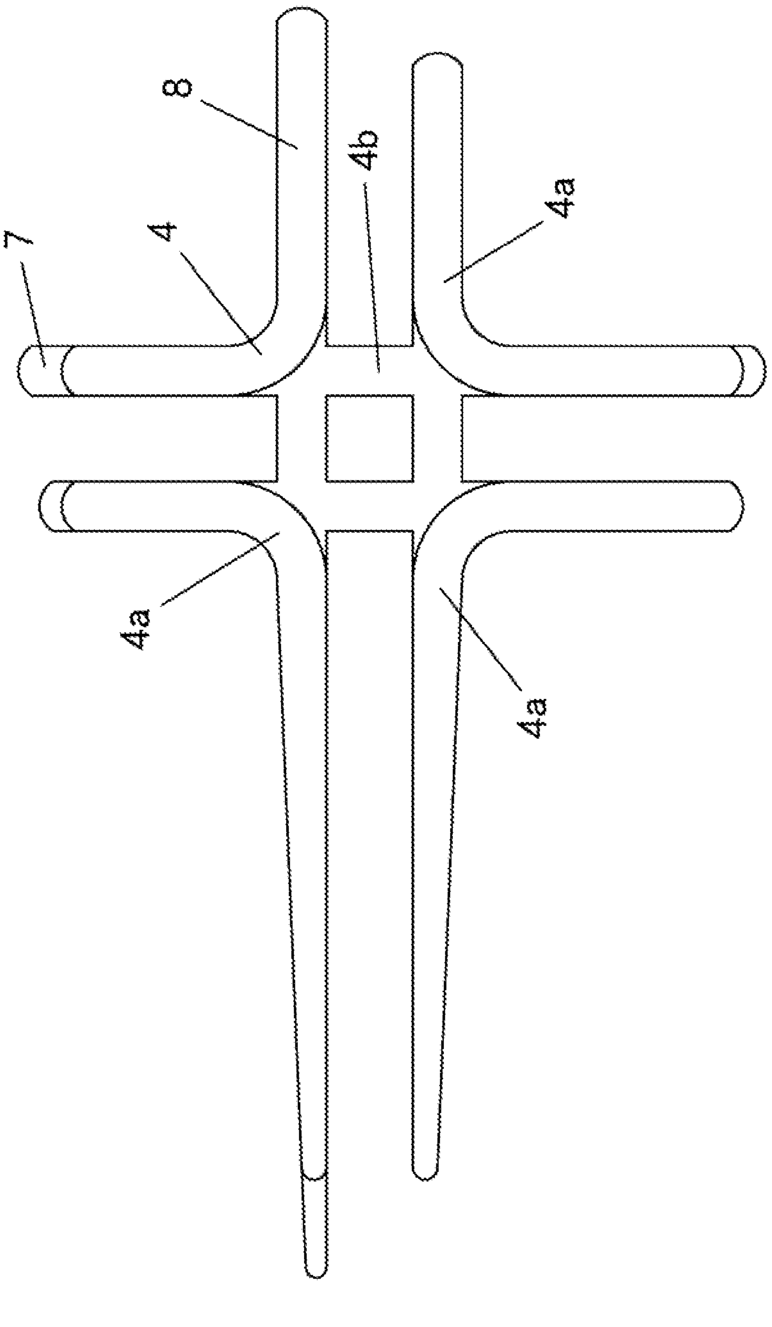
FIG. 7 is a structural schematic diagram of a bar assembly (with connecting bars) in the embodiment of the present invention.
Figure 9:
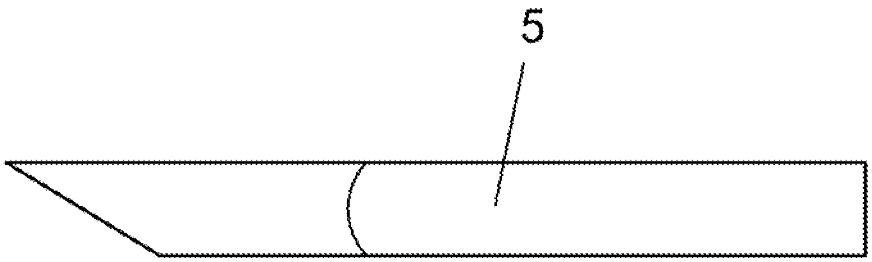
FIG. 9 is a structural schematic diagram of a radial bar according to the embodiment of the present invention.
Figure 10:
FIG. 10 is a side view diagram of a radial bar in the embodiment of the present invention.

Preferred, as shown in FIGS. 7 and 8, the strip-shaped bar member 4*a* is composed of a wooden base 7 and a weight increasing block 8 connected to the wooden base 7. With this design, the central area of soundboard 1 can be further strengthened, playing a positive role in improving the timbre and sound quality of the bass region.

Preferred, an equal number of radial bars 5 are respectively provided in each resonance regions 6 of the soundboard 1. Each radial bar 5 in the same resonance region is arranged in parallel. There is at least one radial bar 5, one end of which is oriented towards the geometric center of the soundboard 1 in the horizontal direction. In addition, the radial bar 5 can also be arranged radially based on the center of the horizontal direction of the soundboard 1.

Preferred, the inner end thickness of the strip-shaped bar member 4*a* is greater than the outer end thickness, and the inner end thickness of the radial bar 5 is greater than the outer end thickness. With this design, it is possible to strengthen the central area of the soundboard 1.

Preferred, the first groove 2 and the second groove 3 are both arc-shaped grooves, which can minimize abrupt changes in thickness of the soundboard 1 and avoid affecting the resonance and vibration of the soundboard 1. The lengths of the first groove 2 and the second groove 3 are both smaller than the horizontal width of the soundboard 1; A smooth transition surface is provided between the outer ends of the two grooves 2 and 3 and the outer wall of the soundboard 1, so that vibration can be more evenly transmitted to the periphery of the soundboard 1.

The following is a description of other embodiments and structural changes of the invention:

1. In the above embodiments, the soundboard shown is only for illustrative purposes, and its structure is not intended to limit the scope of protection of the invention. Other soundboards with similar structures that incorporate the technical features of the invention should be covered by the scope of protection of the invention.
2. In the above embodiment, the number of bar assembly 4 is not limited to one group, but may also be multiple groups in parallel or other designs that help strengthen the load in the middle of the soundboard 1, which is easily understood and accepted by those skilled in the art.
3. In the above embodiment, the strip-shaped bar member 4*a* have an arc and include a long side and a short side as shown in the figures. The long side of the adjacent two strip-shaped bar members 4*a* is arranged on both sides of the second groove 3 in pairs, and the short side of the adjacent two strip-shaped bar members 4*a* is arranged on both sides of the first groove 2 in pairs; Alternatively, the strip-shaped bar member 4*a* may also be a straight strip, with two pairs arranged at 90 degrees and arranged in pairs on both sides of the first groove 2 and the second groove 3.
4. In the above embodiment, the first groove 2 and the second groove 3 are arc-shaped grooves. However, the present invention is not limited to this, and the groove may be designed into other shapes, such as V-shaped, U-shaped, W-shaped, and other concave structures. This is easily understood and accepted by those skilled in the art.

Compared with the prior art, in order to solve the problem that the existing grand piano cannot give consideration to the treble, alto and bass registers and have good resonance timbre at the same time, the invention improves the existing grand piano, especially the design of the soundboard inside the grand piano. It is embodied in the following aspects: first, the bar assembly is set up on the outer wall of the soundboard; Second, a cross groove is set up on the outer wall of the soundboard, so as to form a cross sound tunnel on the outer wall of the soundboard.

Aiming at the problems that the treble of the existing grand piano is not bright, and the bass is not sonorous and mellow enough, the design and sound generating mechanism of the grand piano are deeply discussed and studied, and the main reason for the poor timbre of the treble and the bass of the existing grand piano is found out that the soundboard design is not reasonable. Therefore, the inventor broke the shackles of the previous grand piano structure design and boldly proposed an improved design scheme of the invention. This improved design scheme changed the soundboard from the previous free vibration mode to the current standard vibration mode, and solved the problem that the treble of the grand piano is not bright enough and the bass was not sonorous and mellows enough from the perspectives of vibration, resonance and phonation. The practice proves that the improved design scheme has outstanding substantive characteristics and remarkable technical progress, and has obtained obvious technical results.

In particular, the invention improves the soundboard in response to the prominent sound quality problem in the bass of the existing grand piano, making up for the short range of the piano and broadening the creative width of the composer.

The above embodiments are only intended to illustrate the technical conception and characteristics of the invention, and enable persons familiar with the technology to understand the content of the invention and implement it accordingly, but don't limit the scope of protection of the invention. Any equivalent variation or modification made in accordance with the spirit substance of the invention shall be covered by the protection of the invention.

The invention claimed is:

1. A grand piano soundboard with a bar and sound tunnels comprising:

an inner wall of the soundboard arranged toward the strings of the piano; and an outer wall of the soundboard provided with a first groove and a second groove, wherein the first groove is arranged diagonally in a width direction of the soundboard, and the second groove is arranged diagonally in the length direction of the soundboard; the first groove and the second groove cross and connect with each other on the outer wall of the soundboard, the intersection point is located in the center of the soundboard, and then the outer wall of the soundboard is divided into four resonance regions; a center of the outer wall of the soundboard is also provided with a bar assembly, which comprises a plurality of strip-shaped bar members, which are arranged on both sides of the first groove and the second groove in pairs; the first groove and the second groove respectively form a sound tunnel on the outer wall of the soundboard.

2. The soundboard according to claim 1, wherein:

the soundboard is divided into a treble register in the periphery, an alto register in the middle and a bass register in the center from the sound frequency band; the wall thickness of the soundboard gradually increases from the periphery to the center, and the wall thickness of the bass region is greater than the wall thickness of the alto area, and the wall thickness of the alto region is greater than the wall thickness of the treble region; the bar assembly is located in the bass region.

3. The soundboard according to claim 1, wherein: the strip-shaped bar member is composed of a wooden base and a weight increasing block connected to the wooden base.

4. The soundboard according to claim 1, wherein: a connecting bar is arranged between the adjacent two strip-shaped bar members, and the connecting bar spans above the first groove and the second groove; the bar assembly is well shaped; the connecting bars are located in the central area of the surface of the soundboard.

5. The soundboard according to claim 1, wherein: each resonance region of the soundboard is respectively provided with a plurality of radial bars; each radial bar in the same resonance region is arranged in parallel; there is at least one radial bar, one end of which is oriented towards the geometric center of the soundboard in the horizontal direction.

6. The soundboard according to claim 1, wherein; the soundboard is also provided with a plurality of radial bars, which are located in the resonance regions and radially arranged with the center of the soundboard in the horizontal direction as the reference.

7. The soundboard according to claim 5, wherein: the thickness of the inner end of the radial bar is greater than the thickness of its outer end.

8. The soundboard according to claim 1, wherein: the thickness of the inner end of the strip-shaped bar member is greater than the thickness of its outer end.

9. The soundboard according to claim 1, wherein: the first groove and the second groove are arc grooves.

10. The soundboard according to claim 1, wherein: the length of the first groove and the second groove are less than the horizontal width of the soundboard; a smooth transition surface is arranged between the outer end of the first groove and the second groove and the outer wall of the soundboard.

11. The soundboard according to claim 6, wherein: the thickness of the inner end of the radial bar is greater than the thickness of its outer end.

* * * * *